United States Patent
Kleino

(12) 
(10) Patent No.: US 6,634,698 B2
(45) Date of Patent: Oct. 21, 2003

(54) VIBRATIONAL REDUCTION SYSTEM FOR AUTOMOTIVE VEHICLES

(75) Inventor: Thomas D. Kleino, Rochester Hills, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/858,939

(22) Filed: May 16, 2001

(65) Prior Publication Data

US 2002/0024233 A1 Feb. 28, 2002

Related U.S. Application Data

(60) Provisional application No. 60/225,126, filed on Aug. 14, 2000.

(51) Int. Cl.$^7$ .................................................. B60J 5/04
(52) U.S. Cl. ..................... 296/146.6; 296/191; 296/188
(58) Field of Search ........................ 296/146.6, 146.5, 296/187, 191, 188, 189

(56) References Cited

U.S. PATENT DOCUMENTS

| | | |
|---|---|---|
| 3,868,796 A | 3/1975 | Bush |
| 4,378,395 A | 3/1983 | Asoshina et al. |
| 4,444,818 A | 4/1984 | Tominaga et al. |
| 4,463,870 A | 8/1984 | Coburn, Jr. et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,769,951 A | 9/1988 | Kaaden |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,978,562 A | 12/1990 | Wycech |

(List continued on next page.)

FOREIGN PATENT DOCUMENTS

| | | |
|---|---|---|
| DE | 198 12 288 C1 | 5/1999 |
| DE | 198 56 255 C1 | 1/2000 |

(List continued on next page.)

OTHER PUBLICATIONS

Plastics Handbook, 1994, McGraw–Hill, Inc., pp 158–60.*
International Search Report dated Mar. 4, 2002.

(List continued on next page.)

Primary Examiner—Dennis H. Pedder
Assistant Examiner—Patricia L. Engle
(74) Attorney, Agent, or Firm—Dobrusin & Theinnisch PC

(57) ABSTRACT

A vibration reduction and damping system for use in automotive closure panels, such as doors, lift gates, or other operable hatches comprising an intrusion device and an expandable material, such as a polymer-based foam, disposed along at lease a surface of the intrusion device prior to final assembly of the vehicle by the vehicle manufacturer. The system is activated as the vehicle undergoes the final vehicle assembly process, which activates and transforms the expandable material, preferably during an automobile paint operation, to expand, bond and fill the door assembly structure for vibrational damping and noise reduction.

17 Claims, 3 Drawing Sheets

U.S. PATENT DOCUMENTS

| | | | |
|---|---|---|---|
| 4,995,545 | A | 2/1991 | Wycech |
| 5,124,186 | A | 6/1992 | Wycech |
| 5,213,391 | A | 5/1993 | Takagi |
| 5,266,133 | A | 11/1993 | Hanley et al. |
| 5,358,397 | A | 10/1994 | Ligon et al. |
| 5,373,027 | A | 12/1994 | Hanley et al. |
| 5,506,025 | A | 4/1996 | Otto et al. |
| 5,544,930 | A * | 8/1996 | Stedman ................ 296/146.6 |
| 5,553,910 | A | 9/1996 | Park |
| 5,575,526 | A | 11/1996 | Wycech |
| 5,707,098 | A | 1/1998 | Uchida et al. |
| 5,755,486 | A | 5/1998 | Wycech |
| 5,884,960 | A | 3/1999 | Wycech |
| 5,888,600 | A | 3/1999 | Wycech |
| 5,894,071 | A | 4/1999 | Merz et al. |
| 5,902,656 | A | 5/1999 | Hwang |
| 5,985,435 | A | 11/1999 | Czaplicki et al. |
| 5,992,923 | A | 11/1999 | Wycech |
| 5,997,077 | A | 12/1999 | Siebels et al. |
| 6,003,274 | A | 12/1999 | Wycech |
| 6,006,484 | A | 12/1999 | Geissbuhler |
| 6,033,300 | A | 3/2000 | Schneider |
| 6,068,424 | A | 5/2000 | Wycech |
| 6,079,180 | A | 6/2000 | Wycech |
| 6,092,864 | A | 7/2000 | Wycech et al. |
| 6,096,403 | A | 8/2000 | Wycech |
| 6,099,948 | A | 8/2000 | Paver, Jr. |
| 6,103,341 | A | 8/2000 | Barz et al. |
| 6,103,784 | A | 8/2000 | Hilborn et al. |
| 6,131,897 | A | 10/2000 | Barz et al. |
| 6,135,541 | A | 10/2000 | Geise et al. |
| 6,146,565 | A | 11/2000 | Keller |
| 6,149,227 | A | 11/2000 | Wycech |
| 6,150,428 | A | 11/2000 | Hanley, IV et al. |
| 6,165,588 | A | 12/2000 | Wycech |
| 6,168,226 | B1 | 1/2001 | Wycech |
| 6,189,953 | B1 | 2/2001 | Wycech |
| 6,196,621 | B1 | 3/2001 | VanAssche et al. |
| 6,197,403 | B1 | 3/2001 | Brown et al. |
| 6,199,940 | B1 | 3/2001 | Hopton et al. |
| 6,232,433 | B1 | 5/2001 | Narayan |
| 6,233,826 | B1 | 5/2001 | Wycech |
| 6,237,304 | B1 | 5/2001 | Wycech |
| 6,253,524 | B1 | 7/2001 | Hopton et al. |
| 6,263,635 | B1 | 7/2001 | Czaplicki |
| 6,270,600 | B1 | 8/2001 | Wycech |
| 6,272,809 | B1 | 8/2001 | Wycech |
| 6,276,105 | B1 | 8/2001 | Wycech |
| 6,281,260 | B1 | 8/2001 | Hanley, IV et al. |
| 6,287,666 | B1 | 9/2001 | Wycech |
| 6,296,298 | B1 | 10/2001 | Barz |
| 6,303,672 | B1 | 10/2001 | Papalos et al. |
| 6,305,136 | B1 | 10/2001 | Hopton et al. |
| 6,311,452 | B1 | 11/2001 | Barz et al. |
| 6,315,938 | B1 | 11/2001 | Jandali |
| 6,319,964 | B1 | 11/2001 | Blank et al. |
| 6,321,793 | B1 | 11/2001 | Czaplicki et al. |
| 6,332,731 | B1 | 12/2001 | Wycech |
| 6,341,467 | B1 | 1/2002 | Wycech |
| 6,348,513 | B1 | 2/2002 | Hilborn et al. |
| 6,358,584 | B1 | 3/2002 | Czaplicki |
| 6,368,438 | B1 | 4/2002 | Chang et al. |
| 6,372,334 | B1 | 4/2002 | Wycech |
| D457,120 | S | 5/2002 | Broccardo et al. |
| 6,382,635 | B1 | 5/2002 | Fitzgerald |
| 6,383,610 | B1 | 5/2002 | Barz et al. |
| 6,389,775 | B1 | 5/2002 | Steiner et al. |
| 6,406,078 | B1 | 6/2002 | Wycech |
| 6,413,611 | B1 | 7/2002 | Roberts et al. |
| 6,419,305 | B1 | 7/2002 | Larsen |
| 6,422,575 | B1 | 7/2002 | Czaplicki et al. |
| H2047 | H | 9/2002 | Harrison et al. |
| 6,455,146 | B1 | 9/2002 | Fitzgerald |
| 6,467,834 | B1 | 10/2002 | Barz et al. |
| 6,471,285 | B1 | 10/2002 | Czaplicki et al. |
| 6,474,722 | B2 | 11/2002 | Barz |
| 6,474,723 | B2 | 11/2002 | Czaplicki et al. |
| 6,482,486 | B1 | 11/2002 | Czaplicki et al. |
| 6,482,496 | B1 | 11/2002 | Wycech |
| 6,502,821 | B2 * | 1/2003 | Schneider ................ 296/146.6 |
| 2002/0033617 | A1 | 3/2002 | Blank |
| 2002/0053179 | A1 | 5/2002 | Wycech |
| 2002/0054988 | A1 | 5/2002 | Wycech |

FOREIGN PATENT DOCUMENTS

| | | |
|---|---|---|
| DE | 198 58 903 A1 | 6/2000 |
| EP | 0 061 131 A2 | 9/1982 |
| EP | 0 236 291 A2 | 9/1987 |
| EP | 0 611 778 A3 A3 | 8/1994 |
| EP | 0 893 331 A1 | 1/1999 |
| EP | 0 893 332 A1 | 1/1999 |
| EP | 0 891 918 A1 | 6/1999 |
| EP | 1 122 156 A2 | 8/2001 |
| EP | 0 893 332 B1 | 3/2002 |
| FR | 2 749 263 A1 | 12/1997 |
| GB | 2 061 196 A | 5/1981 |
| JP | 4-300715 A | 10/1992 |
| JP | 4-300716 A | 10/1992 |
| JP | 5-38992 A | 2/1993 |
| WO | WO 89/06595 | 7/1989 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 99/61216 | 12/1999 |
| WO | WO 00/03894 | 1/2000 |
| WO | WO 00/12571 | 3/2000 |
| WO | WO 00/12595 | 3/2000 |
| WO | WO 00/13876 | 3/2000 |
| WO | WO 00/13958 | 3/2000 |
| WO | WO 00/17000 | 3/2000 |
| WO | WO 00/20483 | 4/2000 |
| WO | WO 00/27920 | 5/2000 |
| WO | WO 00/37243 | 6/2000 |
| WO | WO 00/37302 | 6/2000 |
| WO | WO 00/37554 | 6/2000 |
| WO | WO 00/39232 | 7/2000 |
| WO | WO 00/40629 | 7/2000 |
| WO | WO 00/40815 | 7/2000 |
| WO | WO 00/43254 | 7/2000 |
| WO | WO 00/46461 | 8/2000 |
| WO | WO 00/52086 | 9/2000 |
| WO | WO 00/55444 | 9/2000 |
| WO | WO 01/54936 A1 | 8/2001 |
| WO | WO 01/56845 A1 | 8/2001 |
| WO | WO 01/71225 A1 | 9/2001 |
| WO | WO 01/83206 A1 | 11/2001 |
| WO | WO 01/88033 A1 | 11/2001 |

OTHER PUBLICATIONS

Written Opinion dated May 21, 2002.

International Preliminary Examination Report dated Jul. 15, 2002.

Copending U.S. application Ser. No. 09/655,965 filed Sep. 6, 2000.

Copending U.S. application Ser. No. 09/859,126 filed May 16, 2001.
Copending U.S. application Ser. No. 09/906,289 filed Jul. 16, 2001.
Copending U.S. application Ser. No. 09/923,138 filed Aug. 6, 2001.
Copending U.S. application Ser. No. 09/974,017 filed Oct. 10, 2001.
Copending U.S. application Ser. No. 09/939,245 filed Aug. 24, 2001.
Copending U.S. application Ser. No. 09/982,681 filed Oct. 18, 2001.
Copending U.S. application Ser. No. 60/296,312 filed Jun. 6, 2001.
Copending U.S. application Ser. No. 09/676,725 filed Sep. 29, 2000.
Copending U.S. application Ser. No. 09/939,152 filed Aug. 24, 2001.
Copending U.S. application Ser. No. 09/676,443 filed Sep. 29, 2000.
Copending U.S. application Ser. No. 60/317,009 filed Sep. 4, 2001.
Copending U.S. application Ser. No. 09/459,756 filed Dec. 10, 1999.
Copending U.S. application Ser. No. 09/502,686 filed Feb. 11, 2000.
Copending U.S. application Ser. No. 09/524,298 filed Mar. 14, 2000.
Copending U.S. application Ser. No. 09/524,961 filed Mar. 14, 2000.
Copending U.S. application Ser. No. 09/631,211 filed Aug. 3, 2000.
Copending U.S. application Ser. No. 09/676,335 filed Sep. 29, 2000.

* cited by examiner

VIBRATIONAL REDUCTION SYSTEM FOR AUTOMOTIVE VEHICLES

FIELD OF THE INVENTION

The present invention relates generally to improved methods and systems for reducing noise and vibration characteristics in an automotive vehicle. More particularly, the invention relates to an anti-vibration damping material or pellet application system integrated along portions of automotive closure panels, such as portions of an automotive door frame or other panel assembly used to facilitate passenger or cargo ingress/egress to the vehicle. The present invention is applied to selected portions of an automotive vehicle through extrusion techniques resulting in the reduction of vibration and the improvement of sound absorption characteristics of the automotive vehicle.

BACKGROUND OF THE INVENTION

Traditional automotive panel assembly operations generally require a specific pre-assembly manufacturing step or process, which occurs prior to final assembly of the vehicle. Typically for automotive door assemblies, this step or process involves the application of chemical compositions to a traditional door intrusion beam after the beam is shipped to the vehicle manufacturer from the intrusion device supplier. This process requires the vehicle manufacturer to allocate tooling and manufacturing facilities for the intrusion device application at either a separate stamping facility where the door is assembled or in the final vehicle assembly plant. One such technique employs the use of pumpable products applied to the intrusion device in the form of "wet" compositions, which can remain tacky or may otherwise be applied to the beam in a non-uniform manner. For instance, one popular technique utilizes a pumpable product consisting of a thermally activated polymeric material, which upon heat activation expands and fills the space defined between the intrusion device and the outer door panel.

While these prior art system perform well and are advantageous in many circumstances, they often require a large capital investment to integrate the pumpable product into the chosen manufacturing facility, utilize a large amount of floor space and maintenance clean-up resources at the stamping facility or vehicle assembly plant, and require an additional manufacturing process and labor demand. In turn, the manufacturer is required to devote both financial and technical resources to develop tooling for the pumpable product as well as transportation costs, which adds potential cost and delay, particularly if changes to the vehicle structure are implemented during the design stages.

Accordingly, there is need for a simple low cost system that provides an integrated anti-vibration damping material, in the form of a "dry" chemical product which can be extruded-in-place within targeted portions of an automotive panel assembly to reduce vibration characteristics and which can be employed across a wide range of different sizes or shapes of cavities found in automotive vehicles.

SUMMARY OF THE INVENTION

The present invention is directed to a vibration reduction system, and particularly one for automotive frame assemblies, such as (without limitation) vehicle door frame assemblies having a door intrusion device as well as any other automotive closure panel assemblies used in sliding doors, lift gates, or other designs used to facilitate the ingress and egress of passengers and/or cargo to an automotive vehicle. The system generally employs extrusion techniques in the form of a mini-applicator technology for facilitating the application of a dry chemical, anti-vibration damping material onto the intrusion device and/or other selected portion of the door frame, such as the beltline reinforcement, through an extrude-in-place process. It is contemplated that the material disclosed in the present invention functions as an anti-vibration dampener when expanded and bonded to the door intrusion device and optionally the inner and outer body panels, when the intrusion device, such as a intrusion device (now attached to the vehicle in the assembly operation), is processed through paint operations and process cycles typically encountered in a vehicle assembly plant. In one embodiment, the material is heat expandable and at least partially fills the cavity by cross-linking the door intrusion device and the inner and outer door panel during the painting operation thereby reducing noise and vibration characteristics of the vehicle as well as producing a more quiet door assembly when the vehicle door is opened and closed. In another embodiment, the material is a melt-flow material, and upon the application of heat will spread over a surface.

The present invention further serves to eliminate cleanliness and maintenance issues typically encountered through the use of a pumpable product process or application of "wet" chemical technology in either a pre-assembly stamping facility or a vehicle assembly plant since the anti-vibration damping material can be extruded or mini-application bonded onto the door intrusion device prior to paint operation processing. Hence, the present invention can be utilized by either the door intrusion device manufacturer or the vehicle manufacturer and extruded onto the door intrusion device itself for use by the vehicle manufacturer in the final assembly operation.

In a particular preferred embodiment, the damping material or medium comprises a plurality of pellets or a bead that is extruded along and onto portions of the intrusion device in a solid (though pliable) form in accordance with the teachings of commonly owned U.S. Pat. No. 5,358,397 ("Apparatus For Extruding Flowable Materials"), hereby expressly incorporated by reference, such type of apparatus being referred to herein as a "min-applicator." A preferred mini-applicator is an extrude-in-place device suitable for extrusion with or without robotic assistance, and which may be portable or remain stationary in a predetermined location. The use of a mini-applicator advantageously allows extrusion of meltable plastic materials of various section sizes or shapes directly at production or assembly lines. The material or medium is at least partially coated with an active polymer having damping characteristics or other heat activated polymer, (e.g., a formable hot melt adhesive based polymer or an expandable structural foam, examples of which include olefinic polymers, vinyl polymers, polyamides, EVA's, thermoplastic adhesives, thermoplastic rubber-containing polymers, epoxies, urethanes or the like). The pellet then expands and bonds to the intrusion device and the body panel when exposed to the e-coat process as well as other paint operation cycles encountered in a final vehicle assembly facility. In addition, it is contemplated that the present invention may utilize an application of expandable material directly to a structural member or trim component of an automotive vehicle in an automated or otherwise expedited manufacturing process which may involve heating through traditional methods as well as welding and radiation curable technology or cleaning the selected member or part prior to application to assist in adhesion of the expandable material.

In a particular non-limiting embodiment, a plurality of pellets comprised of the vibration damping material or medium are transformed from a solid or dry chemical state to a visco-elastic stage through the use of a suitable mini-applicator which processes the pellets at a temperature sufficient to transform the pellets into a visco-elastic material capable of flowing onto the external surface of a intrusion device in a desired consistency, thickness, and pattern.

The heat application and other shear functions from the mini-applicator allows the material to flow in a uniform shape and manner as it is extruded onto an external surface of the intrusion device, such as a door intrusion beam, where it bonds. Once applied to the external surface of the intrusion device by the mini-applicator and no longer exposed to the heat source emanating from the mini-applicator, the material returns to it solid or dry chemical state and thereby remains disposed in place along the selected portion of the intrusion device. The intrusion device is then mounted within an automotive door assembly or other panel assembly by the vehicle manufacture in accordance with manufacturing techniques that are well known in the art. As the assembly is prepared for final assembly of the vehicle, it is processed through e-coat or other heat-inducing paint operations which result in expansion and bonding of the material from the intrusion device to either or both of the outer panel or the inner panel of the selected automotive closure panel, such as a door frame assembly having an inner door panel and an outer door panel, where it cures and remains in place. It is contemplated that the material expands from the external surface of the intrusion device and cross-links to the substrates, which can comprise either of both of a door inner panel and the door outer panel, thereby serving to reduce the noise and vibration emanating from the door assembly. Although the preferred embodiment discloses the material essentially chemically cross-linking from the external surface of an intrusion device, such as a door intrusion beam, into contact with the door outer panel, it will be appreciated that various patterns and applications of the material along the intrusion device would allow the material to expand and chemically cross-link with either or both of the door inner panel and door outer panel as well as any other substrate that may be utilized or encountered in a door assembly or other application which would facilitate either passenger of cargo access to a vehicle.

In one embodiment the vibration reducing medium is extruded-in-place onto an intrusion device in a continuous or non-continuous extrusion adjacent to one or more inner walls defining a cavity within an automotive door assembly. The vibration reducing medium is activated to accomplish transformation (e.g., expansion or flow) of the active polymer or polymer within the cavity after the door assembly is mounted onto the vehicle and the vehicle is exposed to heat as it is processed through the e-coat and paint operation cycles of a final automotive assembly plant, which is well known in the art. The resulting structure includes a wall or expansive extrusion that is coated over at least a portion of its surface with the vibration reducing medium acting to reduce vibration during transport and during functional operation of the door assembly. It will be appreciated that a preferred vibration reduction medium would consist of a damping material comprising a number of chemical formulations including, but not limited to, metal (such as steel, aluminum, etc.), rubber (such as a butyl or isobutylene polymer, copolymer, or similar elastomer having good damping characteristics), and plastic polymer chemistry (ideally material that would remain rigid at temperatures generally encountered by an automotive body skin during operation of the vehicle, for example −40° C. to 190° C.

DESCRIPTION OF THE DRAWINGS

The features and inventive aspects of the present invention will become more apparent upon reading the following detailed description, claims, and drawings, of which the following is a brief description:

DESCRIPTION OF PREFERRED EMBODIMENT

Figure 1:
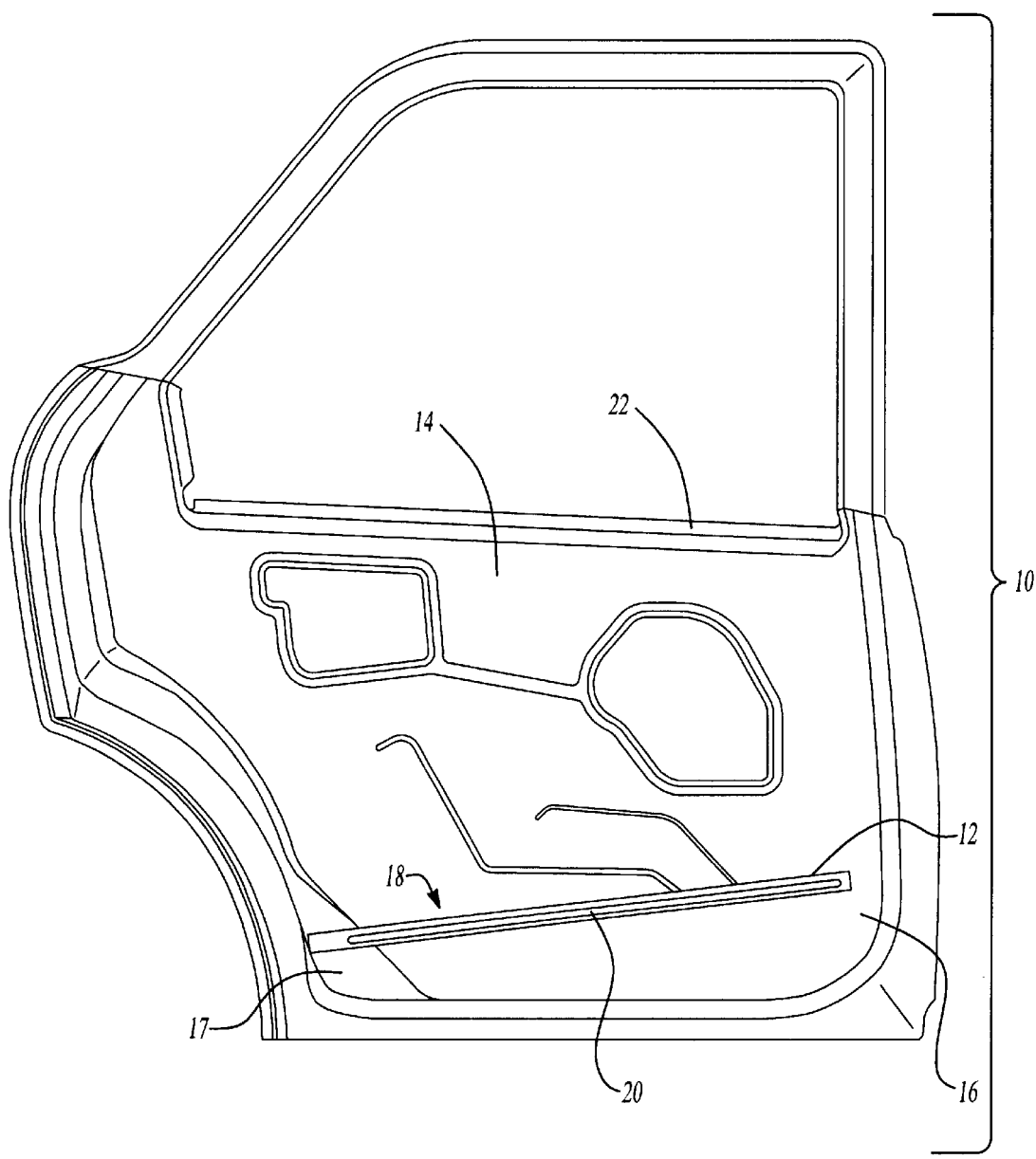
FIG. 1 is a cutaway plan view of a vehicle door assembly with a vibration reducing material extruded-in-place with continuous extrusion in accordance with the present invention prior to activation of the material.

FIG. 1 illustrates an example of an automotive door frame assembly 10 typically encountered in the manufacture of automotive vehicles which includes a door intrusion device 12. As will be appreciated, it is common for such structures to include a plurality of hollow-portioned panel members that are joined and shaped to define the door inner panel 14, within which there are cavities. As will be recognized, examples of a suitable door frame assembly 10 may include cargo doors, lift gates, hatchbacks, sliding doors, easy access third doors, door handles, locks, window assemblies or other vehicle doors and door components, sub-frame construction, or the like. One such structure in FIG. 1, for purposes of illustration (without limitation) includes a door intrusion device 12 which may be in the form of a door intrusion beam. Although the present invention may be used in other portions of a door frame assembly 10 that do not require the presence of a door intrusion device 12 as well as other automotive closure panel assemblies other than doors, the intrusion device 12 is typically comprised of metal (e.g., steel, aluminum, magnesium based, or the like) and may be cold stamped, hot stamped, roll-formed, a tubular beam, a hollow tubular beam, or a hydroformed section. It is also contemplated that the intrusion device 12 could be formed of composite or other high strength polymeric materials depending upon the structural reinforcement required for specific applications of the present invention.

As stated, it is contemplated that a variety of automotive closure panel applications may be treated in accordance with the present invention. In FIG. 1 there is shown a portion of the frame assembly 10 that comprises an intrusion device 12 which bridges the assembly 10 at a first end 16 and a second end 17, the frame 10 assembly thereby defining the door panel compartment. As illustrated in the cutaway view of FIG. 1, the door intrusion device 12 is generally tubular and assists in the reinforcement of the assembly 10 with suitable cross sectional configuration or reinforcements depending upon the size or configuration of the particular application. The intrusion device 12 itself might be hollow and further reinforced, using technology such as that disclosed in U.S. Pat. Nos. 4,922,596, 4,978,562, 5,124,186, and 5,884,960 and commonly owned, co-pending U.S. application Ser. Nos. 09/502,686 filed Feb. 11, 2000 and 09/524,961 filed Mar. 14, 2000, all of which are expressly incorporated by reference.

Vibration reduction of the assembly and door intrusion device 12 is accomplished according to the present invention by an extrusion-in-place or mini-extrusion application of an appropriate pattern 18 of a vibration reduction material 20 of the type discussed herein disposed along either or both of the intrusion device 12 or other selected portion of the door frame assembly 10 such as the belt-line reinforcement member 22 which is formed between the assembly and a corresponding window structure or other portion of the assembly 10 suitable for application of the material 20. The material 20 is applied over at least a portion of the intrusion device 12 or belt-line 22 in accordance with the extrusion techniques, apparatus, and methods set forth in commonly assigned U.S. Pat. No. 5,358,397, incorporated by reference. It will also be appreciated that the material 20 may comprise pellets extruded along the intrusion device 12 and/or belt-line 22 in a variety of continuous and non-continuous patterns. In this regard, it is contemplated that technology disclosed in co-pending U.S. application Ser. No. 09/631, 211 for a Sound Absorption System For Automotive Vehicles, incorporated by reference, may be employed in the present invention. FIG. 1 illustrates an example of this by showing a continuously extruded pattern 18 of the material 20 uniformly extruded along the intrusion device 12. The vibration reduction material 20 preferably is fixedly secured to at least one portion of the intrusion device 12 by one of its own external surfaces. Accordingly, it is preferred that the vibration reduction material 20 is a polymeric foam that includes a bonding component, which maintains it in place on the external surface of the intrusion device 12, and thereafter, upon heat activation maintains its adhesion to the intrusion device 12 but expands to form a foam within the hollow cavity between the door inner panel and the outer panel of the selected frame assembly 10. Thus, preferably the vibration reduction material 20 is a heat-activated material having an adhesive component.

Though other heat-activated materials are possible, a preferred heat activated material is an expandable or flowable polymeric formulation, and preferably one that is activate to foam, flow or otherwise change states when exposed to the heating operation of a typical automotive final assembly painting operation. A particularly preferred material is an active polymer formulated in pellet form with each pellet typically 1–20 mm in diameter and generally, but not necessarily, spherical in shape to facilitate the flow of such pellets through the mini-applicator more fully disclosed in commonly-owned U.S. Pat. No. 5,358,397 ("Apparatus For Extruding Flowable Materials"), incorporated by reference and other olefinic polymer-based acoustic foams, and more particularly an ethylene based polymer. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, Inc. of Romeo, Mich., under the designations as L-2105, L-2100, L-7005 or L-2018, L-7101, L-7102, L-2411, L-2412, L-4141, etc. and may comprise either open or closed cell polymeric base material A number of other suitable materials are known in the art and may also be used for vibration reduction. One such foam preferably includes a polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the vibration reducing foam is usually initially processed as a flowable thermoplastic material before curing. It will cross-link upon curing, which makes the material resistant of further flow or change of final shape.

One advantage of the preferred vibration reduction material 20 is that the preferred material can be processed in several ways, thereby affording substantial design and production flexibility. For instance, without limitation, the preferred materials can be processed by extrusion techniques discussed herein, injection molding, compression molding, or with a mini-applicator discussed herein. This enables the formation and creation of vibration reduction shaping that exceed the capability and maintenance/cleanliness issues of most prior art materials, which comprise "wet" chemistry compositions. In one preferred embodiment, the material 20 or pellet or even a plurality of pellets (in its uncured state) is generally dry or relatively free of tack to the touch. In another embodiment, the material 20 is applied to the intrusion device 12 through a robotic extrusion process, which serves to minimize the maintenance of wet or tacky mediums and further functions to reduce labor demand on the vehicle manufacturer.

In a particular non-limiting embodiment, the material 20 is applied to the intrusion device 12 through the use of a mini-applicator which applies heat and shear to the material 20 in accordance with the teachings of commonly-owned U.S. Pat. No. 5,358,397 ("Apparatus For Extruding Flowable Materials"), which, in turn, transforms the material 20 consisting of a plurality of pellets from a solid or dry chemical state to a visco-elastic state inside the mini-applicator for application of the material 20 to the desired surface in a desired pattern or consistency, namely an external surface of an intrusion device 12 generally found in automotive vehicles, such as a door intrusion beam.

It is contemplated that the mini-applicator prepares the material 20 into a visco-elastic state which can easily and uniformly be applied to an exterior surface of the intrusion device 12 in a relatively clean manner where it hardens and bonds. It will be appreciated that the material 20 can be applied to the intrusion device 12 in a uniform shape, thickness, or consistency which could comprise a continuous flow, a non-continuous flow, a pattern application, and even a ribbed design depending upon the particular application and sizing found between the related intrusion device 12 and the inner and outer panels of the chosen automotive panel assembly. Once the mini-applicator applies the material 20 to the intrusion device 12 in the desired shape and pattern, the material 20 cools at the ambient temperature found in the manufacturing facility which allows the material 20 to return to its original solid or dry chemical state thereby bonding and adhering the material 20 to the external surface of the intrusion device 12. The intrusion device 12 is then place mounted onto the door assembly 10 prior to assembly of the vehicle by the vehicle manufacturer. The door assembly 10 is then integrated into the vehicle for application of the e-coat process as well as other paint operation cycles commonly found in an automotive manufacturing facility. These and paint operating cycles generally involve exposure to heat through cure ovens which activate the material 20 and allow it to expand, thereby chemically cross-linking the material 20 on the external surface of the intrusion device 12 to either or both of the inner door panel or the outer door panel thereby providing a walled or expansive structure which serves to reduce vibration and noise during transport of the vehicle and operation of the door.

While the preferred materials for fabricating the vibration reduction material have been disclosed, the material 20 can be formed of other materials (e.g., foams regarded in the art as structural foams) provided that the material selected is heat-activated or otherwise activated by an ambient condition (e.g. moisture, pressure, time or the like) and cures in a predictable and reliable manner under appropriate conditions for the selected application. One such material is the polymeric based resin disclosed in commonly owned, co-pending U.S. patent application Ser. No. 09/268.810 (filed Mar. 8, 1999), the teachings of which are incorporated herein by reference.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755, 486; 5,575,526; 5,932,680; and WO 00/27920 (PCT/US 99/24795) (all of which are expressly incorporated by reference). Examples of suitable melt flow materials include, without limitation, formulations found in a commonly owned co-pending application for a Paintable Seal System filed Aug. 7, 2000, hereby incorporated by reference. In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In this regard, in applications where a heat activated, thermally expanding material is employed as the vibration reduction material, a consideration involved with the selection and formulation of the material is the temperature at which a material reaction or expansion, and possibly curing, will take place. For instance, in most applications, it is undesirable for the material 20 to be reactive at room temperature or otherwise at the ambient temperature in a production line environment since, in one embodiment, the material 20 is extruded onto the intrusion device by a supplier and then shipped to the vehicle manufacturer as an integrated product. More typically, the material 20 becomes reactive at higher processing temperatures, such as those encountered in an automobile assembly plant, when the material 20 is processed along with the vehicle components at elevated temperatures or at higher applied energy levels, e.g., during e-coat preparation steps and other paint cycles. While temperatures encountered in an automobile e-coat operation may be in the range of about 145° C. to about 210° C. (about 300° F. to 400° F.), primer, filler and paint shop applications are commonly about 93.33° C. (about 200° F.) or higher. The material is thus operative throughout these ranges. If needed, blowing agent activators can be incorporated into the composition to cause expansion at different temperatures outside the above ranges.

Generally, suitable vibration reduction materials have a range of expansion ranging from approximately 0 to over 1000 percent. The level of expansion of the vibration reduction material 20 may be increased to as high as 1500 percent or more. The material may be expandable to a degree (or otherwise situated on a surface) so that individual nodes remain separated from one another upon expansion, or they may contact one another (either leaving interstitial spaces or not).

In another embodiment, the vibration reduction material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

Moreover, the vibration reduction material may include a melt-flowable material such as that disclosed in U.S. Pat. No. 6,030,701 (expressly incorporated by reference).

Figure 2:
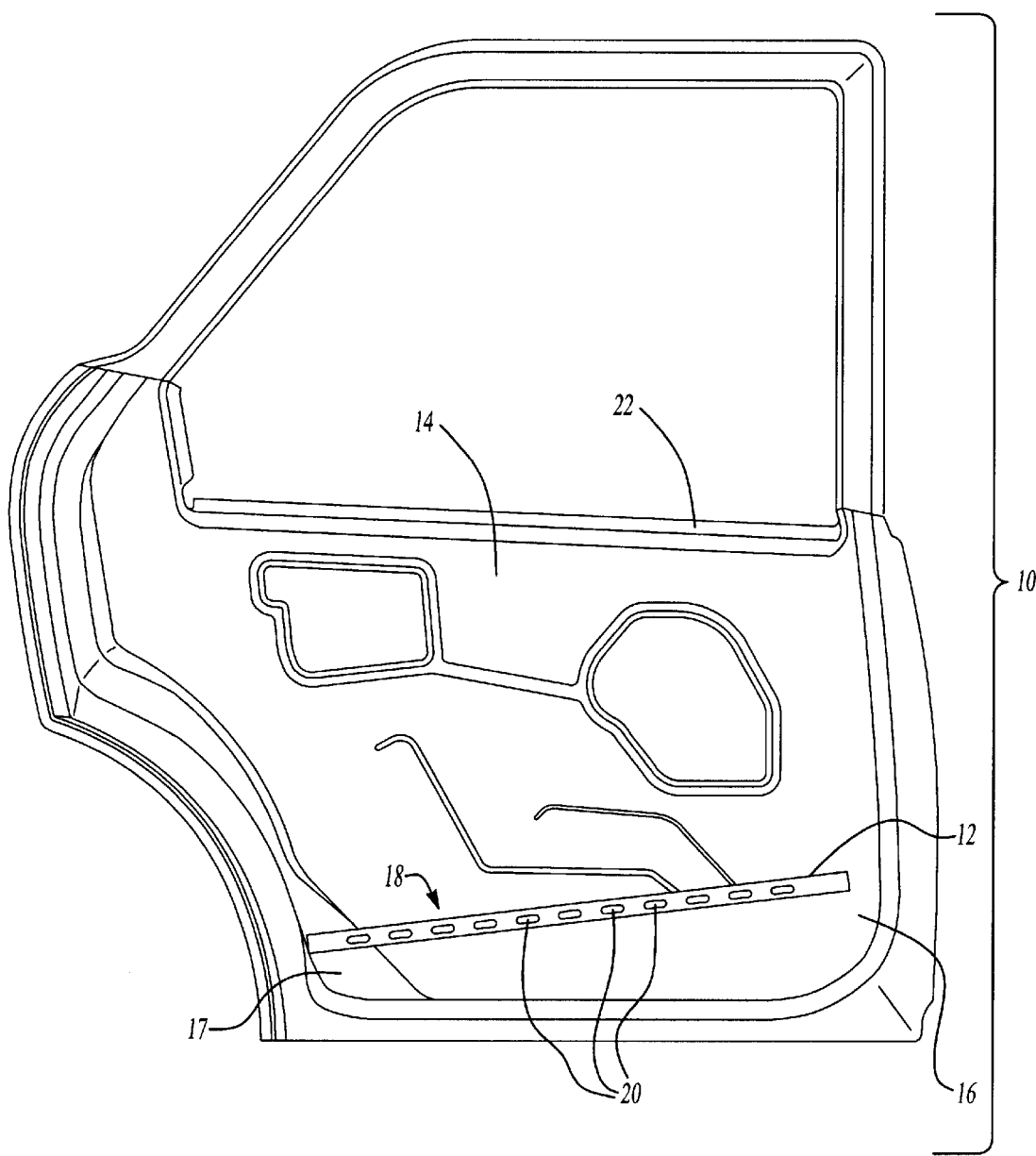
FIG. 2 is a cutaway plan view of a vehicle door assembly with a vibration reducing material extruded-in-place with non-continuous extrusion in accordance with the present invention prior to activation of the material.
Figure 3:
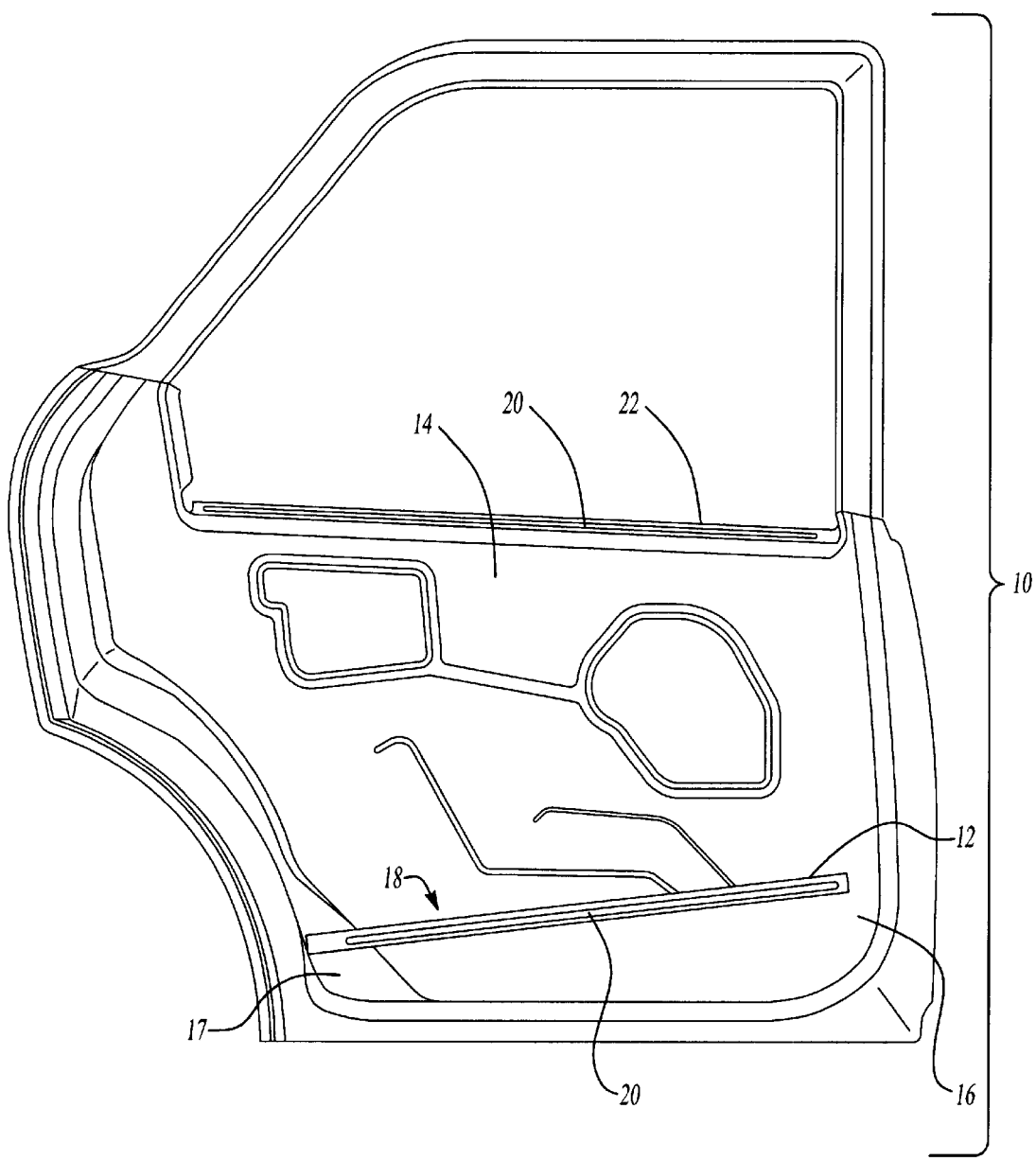
FIG. 3 is a cutaway plan view of a vehicle door assembly utilizing the vibration reducing material of the present invention applied to selected portions of the door frame assembly, including the belt-line reinforcement member.

Referring again to FIG. 1, there is shown one example of a pattern 18 for the vibration reduction material 20 applied to an external surface of an intrusion device 12 prior to heat activation or foaming wherein the material 20 is continuously extruded. FIG. 2 illustrates a non-continuous pattern 18 of the material 20 achieved by non-continuous extrusion. FIG. 3 illustrates the placement of the vibration reduction material along selected portions of the door frame assembly 10 which can include the belt line reinforcement 22 or other visible or exterior portions of an automotive vehicle. The skilled artisan will appreciate that the displacement pattern of the material 20 shown in FIGS. 1–3 are non-limiting examples of many patterns that may be employed. It is contemplated that the material, after expansion, may contain a plurality of nodes which are generally disposed in a random pattern and are generally suitable for the absorption of vibrations and other sound frequencies emanating from the door assembly or otherwise generated by the vehicle or its components including road induced noise and absorb the same. In one preferred embodiment, such patterns and the selection of the material is made for achieving generally miniaturized chamber areas, where it is believed that vibrational energy can be dissipated through the vibrational reduction material.

In addition, as discussed previously, preformed patterns may also be employed such as those made by extruding a sheet (having a flat or contoured surface) and then die cutting it according to a predetermined configuration in accordance with the intrusion device, and applying it thereto, wherein the extrusion may be either continuous, as shown in FIG. 1, or non-continuous, as shown in FIG. 2.

The skilled artisan will appreciate that the use of the vibration reduction system disclosed herein is not intended as being limited only to illustrate the door assembly locations shown in FIG. 1. The present invention can be used in any location within a door or hatch entry into an automotive vehicle that may or may not utilize an intrusion device 12. For instance, other reinforced locations are also possible including, but not limited to, sliding side doors, hatchbacks, rear cargo doors, gates, and crew/club cab designs and the like with or without the presence of an intrusion device 12.

Moreover, the skilled artisan will appreciate that the vibration reduction system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

A number of advantages are realized in accordance with the present invention, including, but not limited to, the ability to manufacture an integrated intrusion device structure ready for delivery and assembly at a vehicle assembly plant without the need for application of pumpable products, wet chemical products, and multiple sets of tools, such as for other prior art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A vibration damping system for a door assembly of an automotive vehicle, the door assembly including an exterior panel structure, the damping system comprising:
    (a) an intrusion device suitable for fixed placement within an automotive vehicle having a first end and a second end mounted to the door assembly, said intrusion device further having exposed surface portions between said first end and said second end; and
    (b) a plurality of nodes of an expandable vibration damping material in bonding contact over at least a portion of said exposed surface portions of said intrusion device prior to expansion, wherein:
        i) the plurality of nodes have an original volume prior to expansion;
        ii) the plurality of nodes expand to an expanded volume that is greater than 1000% of the original volume;
        iii) the nodes of the plurality of nodes each contact an adjacent node of the plurality of nodes and the exterior panel structure after expansion;
        iv) the nodes of the plurality of nodes are applied to the intrusion device in a variety of shapes and sizes with a mini-applicator; and
        v) the nodes of the plurality of nodes are in a random pattern after expansion thereby forming miniaturized chamber areas that absorb various vibrations and sound frequencies;
    wherein the expandable material is configured to reduce vibrations within the closure panel assembly during transport of the vehicle and operation of the assembly.

2. The system as claimed in claim 1, wherein said expandable material is a polymer foam.

3. The system as claimed in claim 1, wherein said intrusion device is a intrusion beam.

4. The system as claimed in claim 1, wherein said expandable material is a heat activated expandable polymer foam.

5. The system as claimed in claim 1, wherein said expandable material is an expandable polymer foam that is generally free of tack to the touch.

6. The system as claimed in claim 5, wherein said expandable material is extruded into pellets.

7. The system as claimed in claim 1, wherein said expandable material is an expandable ethylene-based foam that can be activated at a temperature encountered in an automotive vehicle paint operation.

8. The system as claimed in claim 1, wherein said nodes include a plurality of nodes of different sizes and shape.

9. A system for reducing vibration in an automotive door assembly, the door assembly including an exterior panel structure, the damping system comprising:
    (a) a intrusion device fixedly mounted within an automotive door assembly; and
    (b) an expandable material for reducing vibration disposed over at least a portion of said intrusion device and in contact with said intrusion device prior to expansion of said expandable material prior to expansion, wherein:
        i) the expandable material in a plurality of nodes that have an original volume prior to expansion;
        ii) the plurality of nodes expand to an expanded volume that is greater than 1000% of the original volume; and
        the nodes of the plurality of nodes each contact the exterior panel structure after expansion.

10. The system as claimed in claim 9, wherein said intrusion device is at least partially coated with said expandable material.

11. The system as claimed in claim 9, wherein said expandable material is a heat activated thermoplastic foamable material.

12. The system as claimed in claim 11, wherein said expandable material comprises an extruded pellet.

13. The system as claimed in claim 9, wherein said intrusion device includes an exposed surface.

14. The system as claimed in claim 9, wherein said intrusion device is an automotive intrusion beam.

15. The system as claimed in claim 9, wherein said expandable material is a heat activated expandable polymer foam.

16. The system as claimed in claim 15, wherein said expandable material is an expandable ethylene based foam that can be activated at a temperature encountered in an automotive vehicle paint operation.

17. The system as claimed in claim 9, wherein said expandable material is an expandable ethylene based foam that is generally free of tack to the touch.

* * * * *